United States Patent
Okayama

(10) Patent No.: US 8,630,517 B2
(45) Date of Patent: Jan. 14, 2014

(54) OPTICAL MULTIPLEXER/DEMULTIPLEXER

(75) Inventor: Hideaki Okayama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 392 days.

(21) Appl. No.: 13/164,352

(22) Filed: Jun. 20, 2011

(65) Prior Publication Data

US 2012/0002922 A1 Jan. 5, 2012

(30) Foreign Application Priority Data

Jul. 2, 2010 (JP) .................................. 2010-151620

(51) Int. Cl.
*G02B 6/34* (2006.01)
*G02B 6/10* (2006.01)

(52) U.S. Cl.
USPC ............... 385/37; 385/43; 385/129; 385/130; 385/131

(58) Field of Classification Search
USPC .......................................................... 385/37
See application file for complete search history.

(56) References Cited

U.S. PATENT DOCUMENTS

| | | | | |
|---|---|---|---|---|
| 6,563,988 | B2 * | 5/2003 | McGreer | ........................... 385/43 |
| 6,888,985 | B2 | 5/2005 | Hosoi | |
| 7,194,165 | B2 | 3/2007 | Hosoi | |
| 7,555,175 | B2 | 6/2009 | Nara | |
| 7,840,104 | B2 | 11/2010 | Das et al. | |
| 2007/0071388 | A1 * | 3/2007 | Lu | ................................... 385/37 |

FOREIGN PATENT DOCUMENTS

| | | |
|---|---|---|
| JP | 9-297228 A | 11/1997 |
| JP | 2002-014243 A | 1/2002 |
| JP | 2008-058562 A | 3/2008 |
| JP | 2009-020516 A | 1/2009 |

OTHER PUBLICATIONS

Duk-Jun Kim et al., "Center wavelength uniformity of shallow-etched silicon photonic wire AWG", Group IV Photonics 2009 IEEE paper ThP6, Sep. 10, 2009.

* cited by examiner

*Primary Examiner* — Hemang Sanghavi
(74) *Attorney, Agent, or Firm* — Rabin & Berdo, P.C.

(57) ABSTRACT

A polarization-independent optical multiplexer/demultiplexer with wide passbands has a core including an input optical waveguide, an input slab optical waveguide connected to the input optical waveguide, a waveguide array connected to the input slab optical waveguide, an output slab optical waveguide connected to the waveguide array, a pair of multimode couplers connected to the output slab optical waveguide, and a pair of output optical waveguides connected to the multimode couplers. The multimode couplers are dimensioned so that as both TE and TM polarized light propagates through them, the phase difference between the fundamental and second-order modes changes by an odd multiple of pi radians.

14 Claims, 4 Drawing Sheets

OPTICAL MULTIPLEXER/DEMULTIPLEXER

BACKGROUND OF THE INVENTION

1. Field of the Invention

The present invention relates to a polarization-independent optical multiplexer/demultiplexer employing an arrayed waveguide grating.

2. Description of the Related Art

The use of silicon (Si) as an optical waveguide material is a technology that has gained attention as a way of mass-producing optical elements and reducing their size. One known type of silicon optical element is an optical multiplexer/demultiplexer. This type of element is used in optical subscriber telecommunication systems to multiplex light of different wavelengths into a single optical fiber and to separate the different wavelengths of light exiting the fiber.

Among the various optical multiplexer/demultiplexer structures, recently there has been much interest in optical multiplexer/demultiplexers employing an arrayed waveguide grating (AWG) structure, which combines good multiplexing and demultiplexing characteristics with small size. One example is described by Kim et al. in 'Center wavelength uniformity of shallow-etched silicon photonic wire AWG', Group IV Photonics 2009 IEEE paper ThP6, Sep. 10, 2009.

A silicon AWG optical multiplexer/demultiplexer has the disadvantages of polarization dependency and narrow wavelength passbands. Several Japanese Patent Application Publications (JP) and U.S. Patents (USP) describe structures used to deal with the corresponding problems in quartz waveguides, e.g., JP 2009-20516 (U.S. Pat. No. 7,840,104), JP 2008-058562 (U.S. Pat. No. 7,555,175), JP 2002-14243 (U.S. Pat. Nos. 6,888,985 and 7,194,165), and JP 09-297228 (now Japanese patent No. 3112246). Despite the success of these structures in quartz optical waveguides, however, they have proven difficult to apply to silicon optical waveguides because of the very large wavelength dispersion of silicon optical waveguides.

SUMMARY OF THE INVENTION

An object of the present invention is to provide a polarization-independent silicon AWG optical multiplexer/demultiplexer.

Another object is to provide a polarization-independent silicon AWG optical multiplexer/demultiplexer with wide passbands.

Through diligent study, the inventors have found that these objects can be achieved by using multimode waveguides as output couplers, connected to the output side of the slab optical waveguide situated at the demultiplexing output end of the optical multiplexer/demultiplexer.

An optical demultiplexer/demultiplexer according to the present invention includes an input optical waveguide, an input slab optical waveguide connected to the input optical waveguide, a waveguide array comprising a plurality of channel optical waveguides connected to the input slab optical waveguide, an output slab optical waveguide connected to the waveguide array, first and second multimode couplers each connected as a multimode optical waveguide to the output slab optical waveguide, and first and second output optical waveguides connected to the first and the second multimode couplers, respectively. These waveguides are embedded as a core in a clad. The refractive index of the core differs by at least 40% from the refractive index of the clad.

When light having a first component with a first wavelength and a second component with a second wavelength is input from the input optical waveguide, the first component is output through the first output optical waveguide and the second component is output through the second output optical waveguide.

The first multimode coupler has dimensions such that for both transverse electric (TE) and transverse magnetic (TM) polarized waves, the phase difference between light of the first wavelength propagating in the fundamental mode and light of the first wavelength propagating in the second-order mode through the first multimode coupler, from its point of connection with the output slab optical waveguide to its point of connection with the first output optical waveguide, changes by $(2i+1)\pi$ radians, where i is zero or a positive integer.

Similarly, the second multimode coupler has dimensions such that for both TE and TM polarized waves, the phase difference between light of the second wavelength propagating in the fundamental mode and light of the second wavelength propagating in the second-order mode through the second multimode coupler, from its point of connection with the output slab optical waveguide to its point of connection with the second output optical waveguide, changes by $(2j+1)\pi$ radians, where j is zero or a positive integer.

In some preferred embodiments, when the second wavelength is larger than the first wavelength, the shape of the second multimode coupler is an isosceles trapezoid that narrows from the output slab optical waveguide towards the second output optical waveguide, and the cumulative phase difference between the fundamental and second-order modes is the same for both TE and TM waves of the second wavelength propagating from the point of connection to the output optical slab waveguide to the point of connection with the second multimode coupler.

A silicon AWG optical multiplexer/demultiplexer with the above structure is polarization-independent and has wide passbands owing to the presence of the multimode couplers in the core.

DETAILED DESCRIPTION OF THE INVENTION

Figure 1:
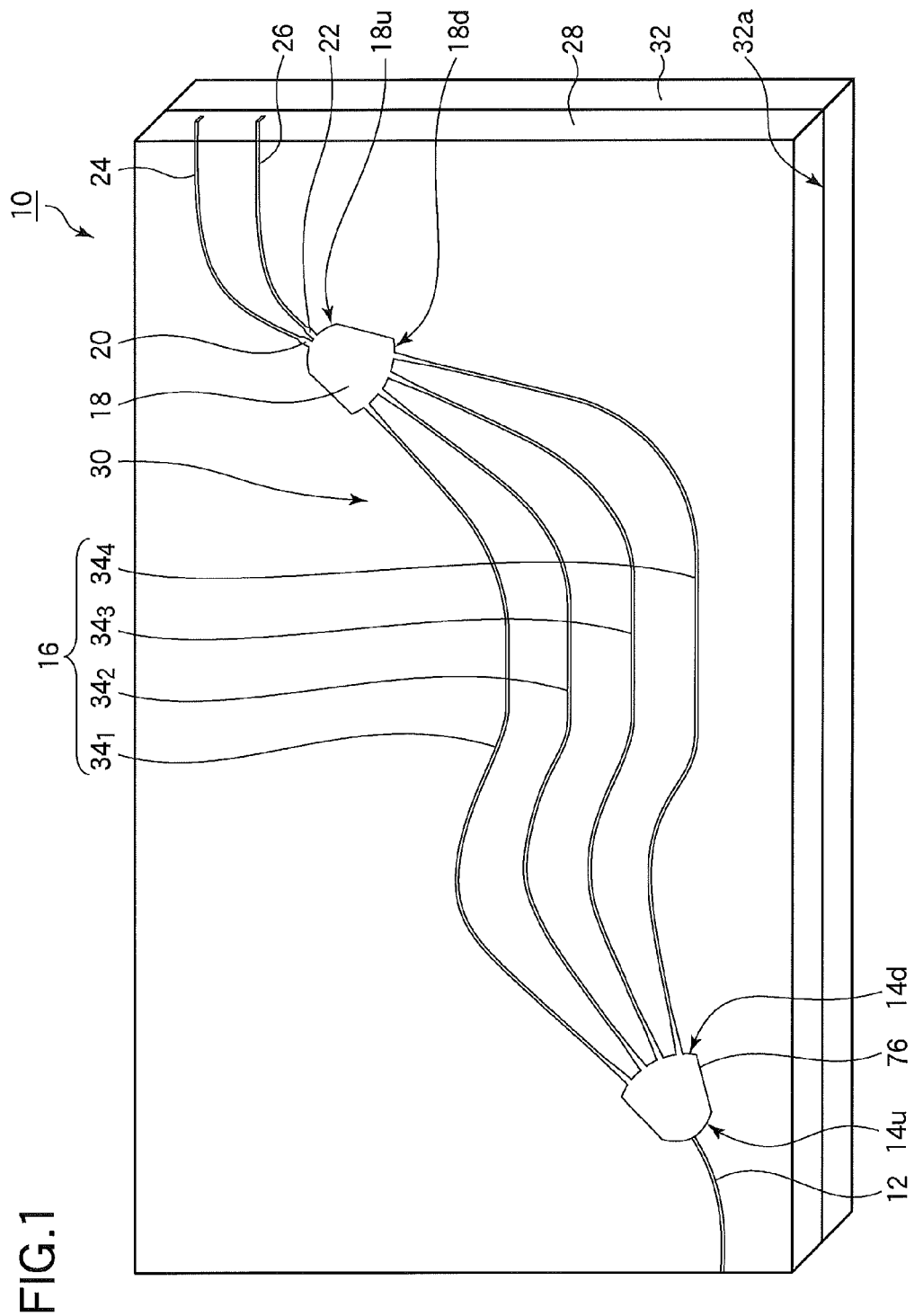
FIG. 1 is a schematic perspective view of an optical multiplexer/demultiplexer according to an embodiment of the present invention.

An embodiment of the invention will now be described with reference to the attached drawings, in which like elements are indicated by like reference characters. Sizes, shapes, and positional relations are shown schematically and are only intended to provide an understanding of the invention. The numerical values and materials mentioned in the following descriptions are intended only as examples. Accordingly, the invention is in no way limited to the following embodiment.

Figure 2:
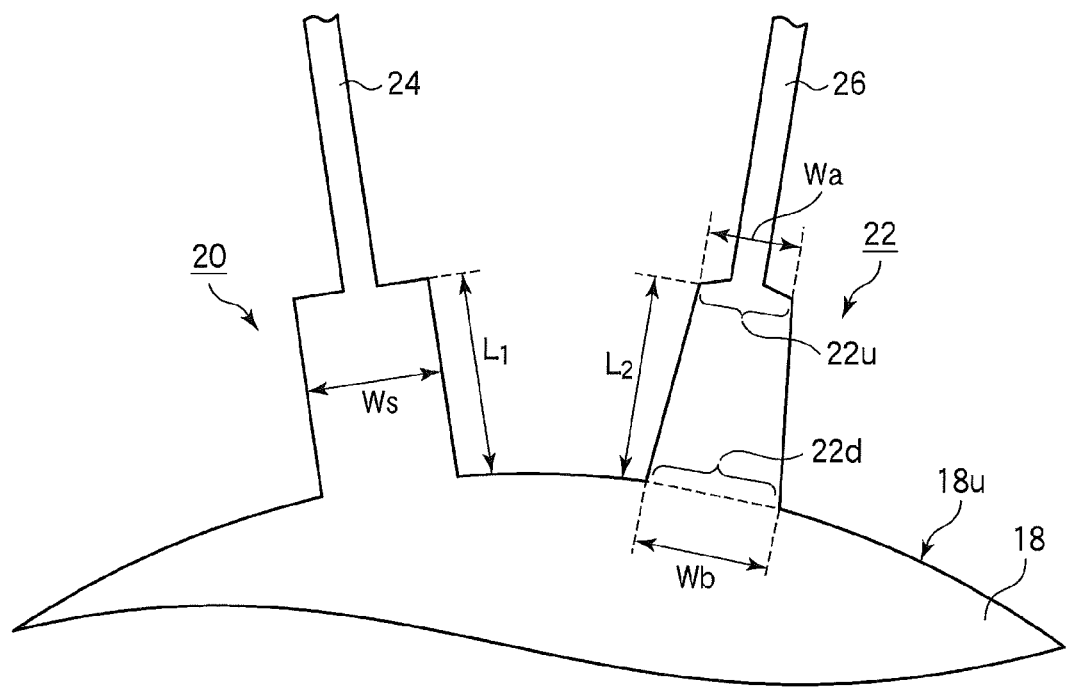
FIG. 2 is an enlarged plan view of the structure around the first and the second multimode couplers in FIG. 1.

The structure of the optical multiplexer/demultiplexer in the embodiment is shown in FIGS. 1 and 2. For clarity, the multiplexer/demultiplexer core structures are indicated by solid lines in FIG. 1, even though they are embedded in the clad and would not be visible to the eye.

The optical multiplexer/demultiplexer 10 in FIG. 1 includes an input optical waveguide 12, an input slab optical waveguide 14, a waveguide array 16, an output slab optical waveguide 18, a first multimode coupler 20, a second multimode coupler 22, a first output optical waveguide 24, and a second output optical waveguide 26, all embedded in a clad 28. The input optical waveguide 12, input slab optical waveguide 14, waveguide array 16, output slab optical waveguide 18, first and second multimode couplers 20, 22, and first and second output optical waveguides 24, 26 function as core elements in the optical multiplexer/demultiplexer 10 and will be referred to collectively as the core 30.

The clad 28 in which the optical multiplexer/demultiplexer 10 is embedded is formed on a major surface 32$a$ of a substrate 32 having, for example, a rectangular shape. The substrate 32 is preferably formed of monocrystalline silicon. The clad 28 is preferably formed of silicon dioxide ($SiO_2$), which has a refractive index of about 1.45.

All the components of the core 30 are preferably formed of the same material. A preferred material is silicon, which has a refractive index of 3.5, differing from (greater than) the refractive index of the clad 14 by more than 40%. The entire core 30 preferably has a uniform thickness of, for example, about 300 nm.

The input optical waveguide 12 guides mixed light, including light with a first wavelength and light with a second wavelength different from the first wavelength, towards the optical multiplexer/demultiplexer 10. Exemplary preferred cross-sectional dimensions of the input optical waveguide 12 are about 300 nm in the height direction orthogonal to the major surface 32$a$ of the substrate 32 and about 300 nm in the width direction parallel to the major surface 32$a$. These dimensions make the input optical waveguide 12 a polarization-independent channel optical waveguide, as is well known.

The first and second wavelengths are preferably wavelengths used in optical subscriber telecommunication systems. Exemplary preferred wavelengths are about 1.31 micrometers (μm) for the first wavelength and about 1.49 μm for the second wavelength. These values will be assumed in the following description. For brevity, light of the first wavelength will be referred to as first wavelength light, and light of the second wavelength will be referred to as second wavelength light.

The input slab optical waveguide 14 has the general shape of an isosceles trapezoid, except that the top base 14$u$ and bottom base 14$d$ of the trapezoid are convex, each having a certain radius of curvature. The top base 14$u$ is shorter than the bottom base 14$d$. The input optical waveguide 12 is connected to the top base 14$u$, and the waveguide array 16 is connected to the bottom base 14$d$. The mixed light is input from the input optical waveguide 12 to the input slab optical waveguide 14 and spread by diffraction as it propagates through the input slab optical waveguide 14. Respective portions of the spread light are input to channel optical waveguides $34_1$ to $34_4$, which constitute the waveguide array 16.

The optical lengths of the channel optical waveguides $34_1$ to $34_4$ constituting the waveguide array 16 vary regularly. More specifically, the lengths of the channel optical waveguides $34_1$ to $34_4$ are adjusted so that the differences in optical length between adjacent channel optical waveguides are 0.66 μm. This value enables light with the first and second wavelengths given above to be separated from the mixed light. The cross-sectional dimensions of the channel optical waveguides $34_1$ to $34_4$ in a plane orthogonal to the direction of light propagation are similar to the cross-sectional dimensions of the input optical waveguide 12: about 300 nm high and about 300 nm wide.

The number of channel optical waveguides constituting the waveguide array 16 is not limited to the four shown in FIG. 1. The number of channel optical waveguides is a design choice that can be made according to, for example, the spacing between the wavelengths to be demultiplexed.

The output slab optical waveguide 18 is a slab optical waveguide having same shape as the input slab optical waveguide 14: an isosceles trapezoid with a convex top base 18$u$ and a convex bottom base 18$d$, each having a certain radius of curvature, the top base 18$u$ being shorter than the bottom base 18$d$. The channel optical waveguides $34_1$ to $34_4$ constituting the waveguide array 16 are connected at equal intervals to the bottom base 18$d$. The first and second multimode couplers 20, 22 are connected to the top base 18$u$. Of the mixed light that propagates through the waveguide array 16 into the output slab optical waveguide 18, the first wavelength light is focused onto the first multimode coupler 20 and the second wavelength light is focused onto the second multimode coupler 22.

The multimode couplers 20, 22 connected to the top base 18$u$ of the output slab optical waveguide 18 are multimode optical waveguides. The first multimode coupler 20, which receives the light of the first wavelength (1.31 μm) from the output slab optical waveguide 18, has a rectangular shape in plan view, as shown in FIG. 2. The overall length of the first multimode coupler 20 in the direction of light propagation is denoted $L_1$, and its width orthogonal to the direction of light propagation and parallel to the major surface 32$a$ of the substrate 32 is denoted Ws. These dimensions are chosen as described later so that the first multimode coupler 20 has a widened passband at the first wavelength and is polarization-independent at this wavelength, guiding both TM and TE waves alike.

The second multimode coupler 22 in FIG. 2 has the general shape of an isosceles trapezoid with its longer base, the bottom base 22$d$, connected to the output slab optical waveguide 18 to receive the light of the second wavelength (1.49 μm). The overall length of the second multimode coupler 22 in the direction of light propagation is denoted $L_2$, the width of its top base is denoted Wa, and the width of the bottom base 22$d$ is denoted Wb. These dimensions are chosen as described later so that the second multimode coupler 22 has a widened passband at the second wavelength and is polarization-independent at this wavelength, guiding both TM and TE waves alike.

The first and second output optical waveguides 24, 26 have the function of external output of the light of the first and second wavelengths demultiplexed in the optical multiplexer/demultiplexer 10. The first output optical waveguide 24 is connected to the first multimode coupler 20 and outputs the first wavelength light. The second output optical waveguide 26 is connected to the second multimode coupler 22 and outputs the second wavelength light.

Next, the principle by which the passbands are widened will be described with reference to FIGS. 3A, 3B, and 4.

Figure 3A:
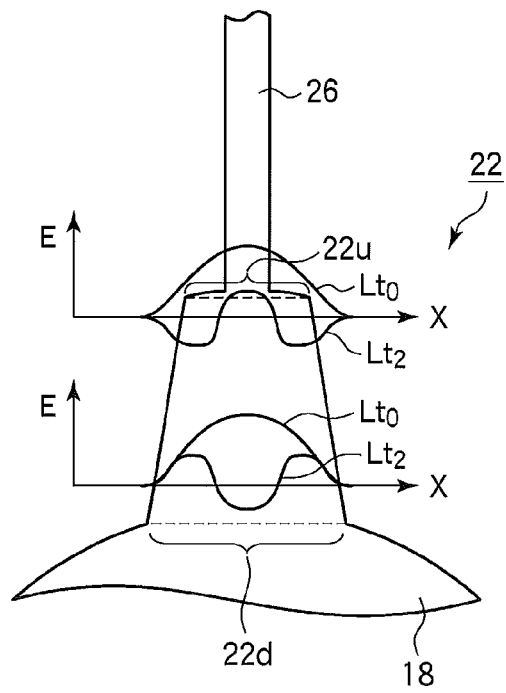
FIG. 3A schematically illustrates the electric field distributions of the fundamental and second-order modes excited by the second multimode coupler for light of the second wavelength, superimposed on a plan view of the second multimode coupler.
Figure 3B:
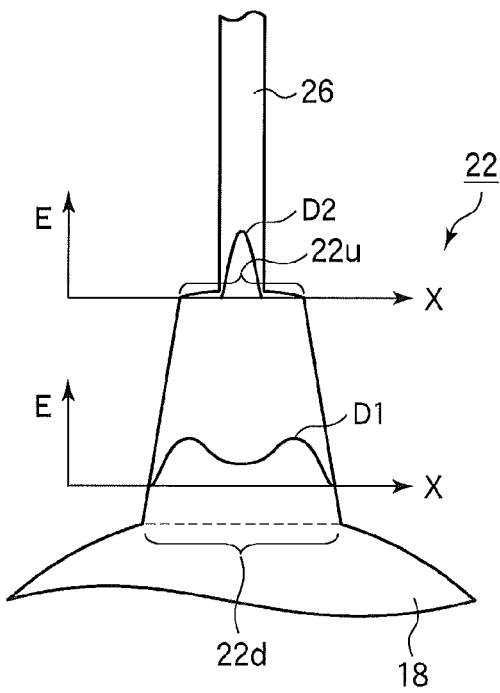
FIG. 3B schematically illustrates the combined optical field distribution of the fundamental and second-order modes shown in FIG. 3A.

FIGS. 3A and 3B show electric field distributions of the second wavelength light superimposed on a plan view of the second multimode coupler 22. As a multimode optical waveguide, the second multimode coupler 22 excites modes from the fundamental mode to the second-order mode. FIG. 3A shows the electric field distributions of the fundamental mode and second-order mode separately. The dimensions Wa, Wb, and $L_2$ of the second multimode coupler 22 are selected so that for the second wavelength, as fundamental mode light $Lt_0$ and second-order mode light $Lt_2$ propagate from the bottom base 22d to the top base 22u, the phase difference between the two modes changes by an odd multiple of pi radians, that is, by $(2j+1)\pi$, where j is a non-negative integer.

FIG. 3B shows the combined optical field distribution of these two modes. Wa, Wb, and $L_2$ are set to values such that the fundamental mode light $Lt_0$ and second-order mode light $Lt_2$ give a generally flat combined optical field distribution D1 at the bottom base 22d, where the second multimode coupler 22 is connected to the output slab optical waveguide 18, and a sharply peaked optical field distribution D2 at the top base 22u, where the second multimode coupler 22 is connected to the second output optical waveguide 26.

A specific design procedure for choosing Wa, Wb, and $L_2$ will be described in the discussion of polarization independence.

The flat optical field distribution D1 obtained at the bottom base 22d gives the optical multiplexer/demultiplexer 10 a wide passband for second wavelength light. In other words, the optical multiplexer/demultiplexer 10 has enhanced tolerance to error in the wavelength of the second wavelength light. The reason is illustrated in FIG. 4, which shows the combined optical field distribution D1 of the second wavelength light at the bottom base 22d together with the focal peak distribution P of the second wavelength light as it enters the second multimode coupler 22.

Figure 4:
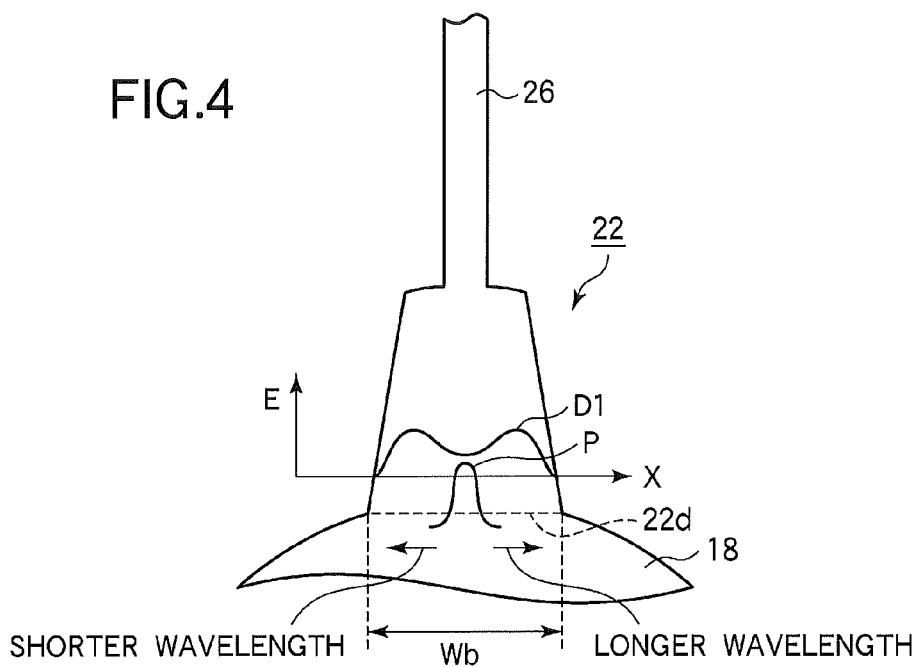
FIG. 4 schematically illustrates the combined optical field of the fundamental and second-order modes at the bottom base of the second multimode coupler, and the focal peak of light of the second wavelength propagating towards the second multimode coupler.

A shift in the wavelength of the second wavelength light moves the focal peak distribution P sideways in FIG. 4. The focal peak moves toward the left if the second wavelength decreases, and toward the right if the second wavelength increases. The intensity of light output from the second multimode coupler 22 into the second output optical waveguide 26 is given by the overlap integral of the combined optical field distribution D1 and the focal peak distribution P. Since the combined optical field distribution D1 is substantially flat over the width Wb of the bottom base 22d, the second multimode coupler 22 can output light with sufficient intensity as long as the second wavelength has a value such that the focal peak distribution P fits within the width Wb of the bottom base 22d. That is, the second multimode coupler 22 has a wide passband, equivalent to the width Wb of the bottom base 22d.

The second multimode coupler 22 also excites a first-order mode, but symmetry considerations show that the first-order mode light has no effect on the operation of the second multimode coupler.

The above discussion also applies to the first multimode coupler 20. The dimensions Ws and $L_1$ of the first multimode coupler 20 are set to values such that at the first wavelength, the phase difference between the fundamental mode light and the second-order mode light changes by $(2i+1)\pi$ radians (where i is a non-negative integer) as the light propagates through the first multimode coupler 20 from the point of connection to the output slab optical waveguide 18 to the point of connection to the first output optical waveguide 24. As a result, the first multimode coupler 20 has a wide passband for first wavelength light. A specific design procedure for Ws and $L_1$ will be given later.

Next, how the first and second multimode couplers 20, 22 are made polarization independent will be described.

In order to make the first wavelength light polarization independent, it suffices to adjust the dimensions of the first multimode coupler 20 so that for both TE and TM polarized waves of the first wavelength, the difference in equivalent refractive index between the fundamental mode and second-order mode is the same.

Similarly, in order to make the second wavelength light polarization independent, it suffices to adjust the dimensions of the second multimode coupler 22 so that for both TE and TM polarized waves of the second wavelength, the difference in equivalent refractive index between the fundamental mode and second-order mode is the same.

Figure 5:
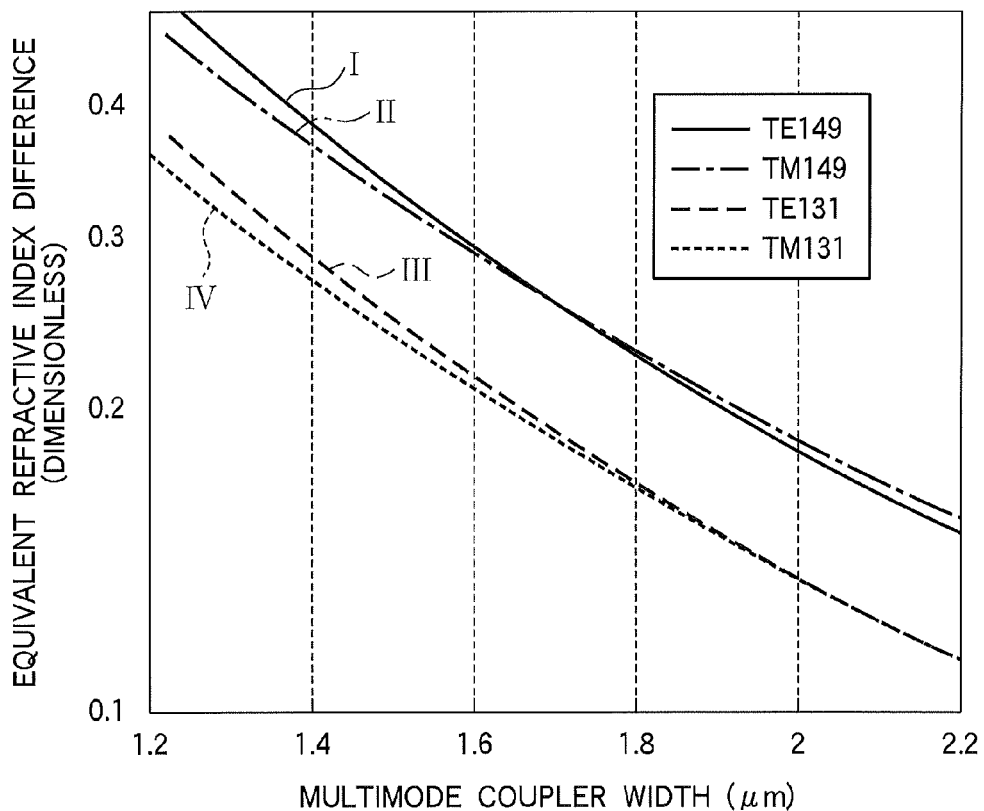
FIG. 5 is a graph for determining dimensions of a rectangular multimode coupler that produce polarization independence at the first and second wavelengths.

The graph in FIG. 5 shows the results of a simulation of these equivalent refractive index differences as a function of coupler width for first and second wavelength light. The equivalent refractive index difference between the fundamental mode and second-order mode is indicated as a dimensionless quantity on the vertical axis. The width of the multimode coupler is indicated in micrometers (μm) on the horizontal axis. The simulation was conducted by the finite element method for a rectangular multimode silicon coupler (refractive index: 3.5) 300 nm wide embedded in a $SiO_2$ clad (refractive index: 1.45).

FIG. 5 shows four curves: curve I represents a TE wave and curve II a TM wave of the second wavelength (1.49 μm), while curve III represents a TE wave and curve IV a TM wave of the first wavelength (1.31 μm).

The curves III and IV representing the first wavelength have substantially identical values when the width of the multimode coupler is 2 μm to 2.2 μm. In other words, when the multimode coupler receiving the first wavelength light, more specifically the first multimode coupler 20, has a width Ws of about 2 μm and a length $L_1$ adjusted according to this width Ws, it can achieve both polarization independence and a widened passband.

A simulation was carried out by the three dimensional finite difference time domain (FDTD) method to determine the width Ws and length $L_1$ of the first multimode coupler 20 precisely. This simulation showed that polarization independence and a widened passband are achieved with a width Ws of 2 μm and a length $L_1$ of 5 μm.

The curves I and II representing the second wavelength in FIG. 5 have substantially identical values when the width of the multimode coupler is about 1.7 μm. An attempt was made to use this width (1.7 μm) to determine the length of a rectangular multimode coupler receiving the second wavelength light by a three dimensional FDTD simulation, but a satisfactorily wide passband could not be obtained. The simulation showed that a rectangular multimode coupler 1.7 μm wide is too narrow in comparison with the focal peak diameter of the second wavelength light.

For this reason, the multimode coupler receiving the second wavelength light was given an isosceles trapezoidal shape in which the width Wb of the bottom base 22d is larger than the width Wa of the top base 22u, as illustrated by the second multimode coupler 22 in the drawings. With this shape of the second multimode coupler 22, it was also possible to match the cumulative phase difference between the fundamental and second-order modes for TE and TM waves of the second wavelength light propagating from the bottom base 22d to the top base 22u, thereby achieving polarization independence.

A three dimensional FDTD simulation of the second multimode coupler 22 revealed that the width Wb of the bottom base 22d is preferably 1.9 µm or greater, and is preferably at least 1.2 times the width Wa of the top base 22u.

Based on these simulations, the dimensions of the second multimode coupler 22 in this embodiment are as follows: the width Wa of the top base 22u is 1.65 µm; the width Wb of the bottom base 22d is 1.98 µm; the overall length $L_2$ is 2.5 µm. A second multimode coupler of these dimensions achieves both polarization independence and a widened passband for second wavelength light.

Figure 6A:
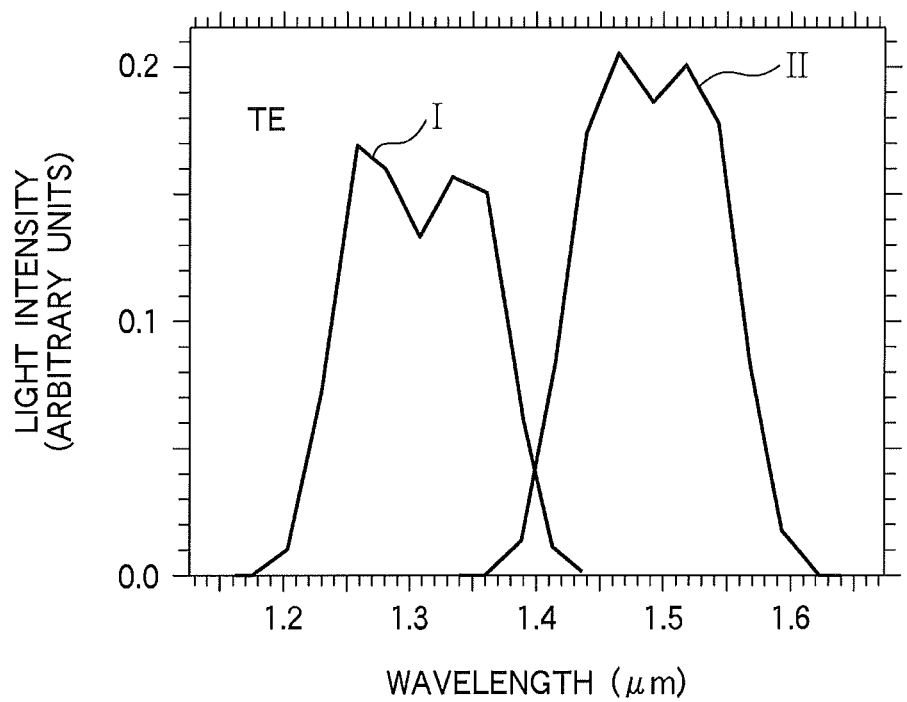
FIGS. 6A and 6B are graphs showing simulated output intensities of TE and TM waves as functions of wavelength.
Figure 6B:
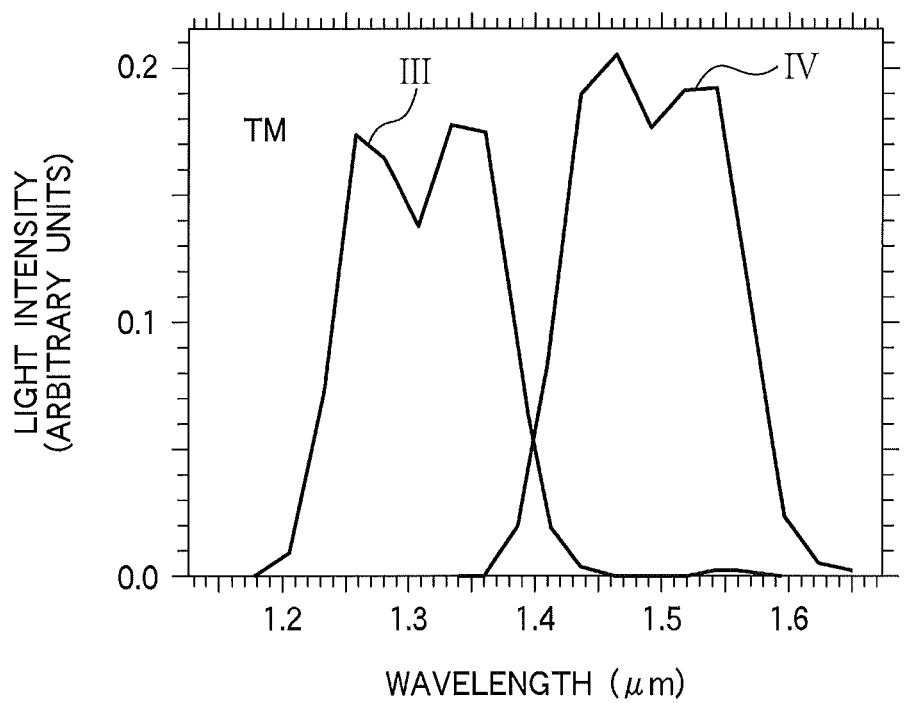

The effects of the optical multiplexer/demultiplexer 10 are indicated more directly by the graphs in FIGS. 6A and 6B, which show the simulated output light intensity as a function of wavelength. FIG. 6A shows the intensity of TE polarized light of the first wavelength (curve I) and second wavelength (curve II). FIG. 6B shows the intensity of TM polarized light of the first wavelength (curve III) and second wavelength (curve IV). In both graphs, the vertical axis indicates light intensity in arbitrary units, and the horizontal axis indicates wavelength in micrometers.

First and second multimode couplers 20, 22 having the dimensions stated above were used in the simulation. Both the input slab optical waveguide 14 and the output slab optical waveguide 18 had an overall length of 17 µm and a width of 20 µm. The channel optical waveguides of the waveguide array 16 were connected to the input slab optical waveguide 14 and the output slab optical waveguide 18 at intervals of 1 µm as measured between their core axes. The first multimode coupler 20 and the second multimode coupler 22 were connected to the top base 18u of the output slab optical waveguide 18 with a spacing of 2 µm between their core axes. The simulation was conducted by the three dimensional FDTD method.

As can be seen from the curves in FIGS. 6A and 6B, the optical multiplexer/demultiplexer 10 has a passband of substantially ±0.05 µm around the center wavelengths of both of the first and the second wavelength light. TE polarized light (curve I) and TM polarized light (curve III) of the first wavelength are output with substantially the same intensity. Similarly, TE polarized light (curve II) and TM polarized light (curve IV) of the second wavelength light are output with substantially same intensity. The optical multiplexer/demultiplexer 10 therefore operates in a polarization independent manner.

Although the preceding description has dealt only with the demultiplexing function, it will be appreciated that the optical multiplexer/demultiplexer 10 can also operate as a multiplexer with the direction of light propagation reversed.

Those skilled in the art will recognize that further variations of the preceding embodiment are possible within the scope of the invention, which is defined in the appended claims.

What is claimed is:

1. An optical multiplexer/demultiplexer having a core embedded in a clad, the core comprising:

an input optical waveguide for input of mixed light including light of a first wavelength and light of a second wavelength;

an input slab optical waveguide connected to the input optical waveguide;

a waveguide array comprising a plurality of channel optical waveguides connected to the input slab optical waveguide;

an output slab optical waveguide connected to the waveguide array;

a first multimode coupler configured as a multimode optical waveguide connected to the output slab optical waveguide;

a second multimode coupler configured as a multimode optical waveguide connected to the output slab optical waveguide;

a first output optical waveguide connected to the first multimode coupler for output of the light of the first wavelength; and a second output optical waveguide connected to the second multimode coupler for output of the light of the second wavelength; wherein the core and the clad have refractive indexes mutually differing by at least 40%;

the first multimode coupler has dimensions such that for both TE and TM polarized waves, a phase difference between the light of the first wavelength propagating in a fundamental mode and the light of the first wavelength propagating in a second-order mode through the first multimode coupler, from a point of connection with the output slab optical waveguide to a point of connection with the first output optical waveguide, changes by $(2i+1)\pi$ radians, where i is a non-negative integer; and, the second multimode coupler has dimensions such that for both TE and TM polarized waves, a phase difference between the light of the second wavelength propagating in the fundamental mode and the light of the second wavelength propagating in the second-order mode through the second multimode coupler, from a point of connection with the output slab optical waveguide to a point of connection with the second output optical waveguide, changes by $(2j+1)\pi$ radians, where j is a non-negative integer.

2. The optical multiplexer/demultiplexer of claim 1, wherein for both the TE and TM polarized waves of the first wavelength, the first multimode coupler has identical differences in equivalent refractive index between the fundamental mode and the second-order mode.

3. The optical multiplexer/demultiplexer of claim 1, wherein for both the TE and TM polarized waves of the second wavelength, the second multimode coupler has identical differences in equivalent refractive index between the fundamental mode and the second-order mode.

4. The optical multiplexer/demultiplexer of claim 1, wherein the core is formed of silicon.

5. The optical multiplexer/demultiplexer of claim 1, wherein the clad is formed of silicon dioxide.

6. The optical multiplexer/demultiplexer of claim 1, wherein the first multimode coupler has a rectangular shape.

7. The optical multiplexer/demultiplexer of claim 6, wherein the first multimode coupler has a width of at least 2 micrometers.

8. The optical multiplexer/demultiplexer of claim 7, wherein the first multimode coupler has a width of at most 2.2 micrometers.

9. The optical multiplexer/demultiplexer of claim 6, wherein the first multimode coupler has a width of substantially 2 micrometers and a length of substantially 5 micrometers.

10. The optical multiplexer/demultiplexer of claim 1, wherein the second wavelength is greater than the first wavelength, and the second multimode coupler has an isosceles trapezoidal shape that narrows from the output slab optical waveguide towards the second output optical waveguide.

11. The optical multiplexer/demultiplexer of claim 10, wherein both TE and TM polarized waves of the second wavelength have identical cumulative phase differences between the light propagating in the fundamental mode and the light propagating in the second-order mode through the second multimode coupler, from the point of connection with the output slab optical waveguide to the point of connection with the second output optical waveguide.

12. The optical multiplexer/demultiplexer of claim 10, wherein the second multimode coupler has a bottom base connected to the output slab waveguide and a top base connected to the second output optical waveguide, the bottom base being at least 1.2 times as wide as the top base.

13. The optical multiplexer/demultiplexer of claim 12, wherein the bottom base of the second multimode coupler has a width of at least 1.9 micrometers.

14. The optical multiplexer/demultiplexer of claim 12, wherein the top base of the second multimode coupler is substantially 1.65 μm wide, the bottom base of the second multimode coupler is substantially 1.98 μm wide, and the second multimode coupler has an overall length of substantially 2.5 μm.

\* \* \* \* \*